Aug. 29, 1950 G. F. MASSEY 2,520,556
BABCOCK TEST MIXER
Filed Jan. 6, 1947 2 Sheets-Sheet 1

Inventor
George F. Massey

By *Clarence A. O'Brien
and Harvey B. Jacobson*
Attorneys

Aug. 29, 1950  G. F. MASSEY  2,520,556
BABCOCK TEST MIXER

Filed Jan. 6, 1947  2 Sheets-Sheet 2

Inventor

George F. Massey

By *Clarence A. O'Brien and Harvey B. Jacobson*
Attorneys

Patented Aug. 29, 1950

2,520,556

UNITED STATES PATENT OFFICE 2,520,556

BABCOCK TEST MIXER

George F. Massey, Fond du Lac, Wis.

Application January 6, 1947, Serial No. 720,434

5 Claims. (Cl. 259—54)

The present invention relates to new and useful improvements in mixing devices and more particularly to a device of this character for use in mixing acid with milk or cream in Babcock test bottles.

An important object of the present invention is to provide a device of this character in which a number of test bottles may be mixed simultaneously without requiring individual handling of the bottles during mixing of the contents thereof.

A further object of the invention is to provide a mixing tray in which a carrying tray for the test bottles is placed and providing means for oscillating the mixing tray in an elliptical motion to more effectively and thoroughly accomplish the mixing of the acids and milk.

A still further object of the invention is to provide means for supporting the bottles in an inclined position in the mixing tray to reduce danger of the milk and acid being forced up into the neck of the test bottles.

A still further object of the invention is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
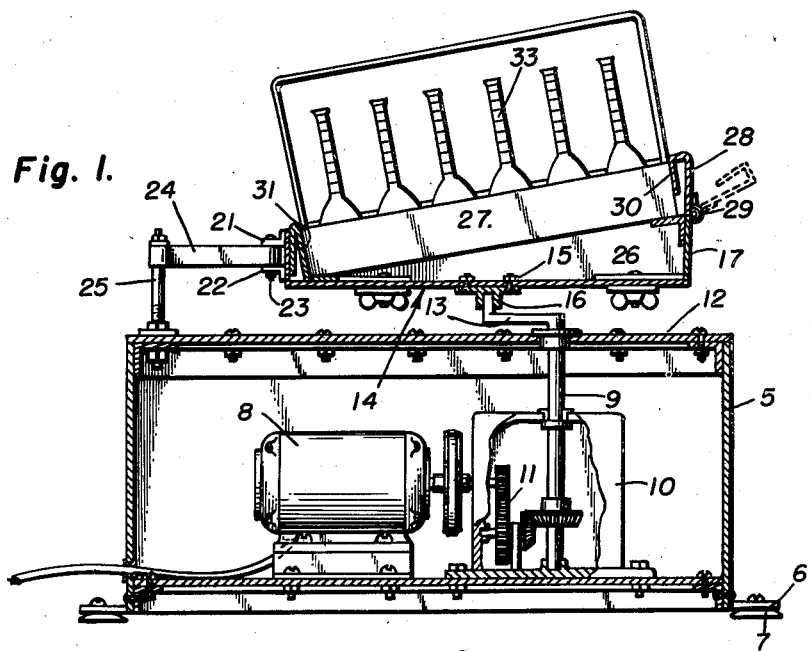
Figure 1 is a vertical sectional view of the motor cabinet and mixing tray operatively mounted thereon.
Figure 2:
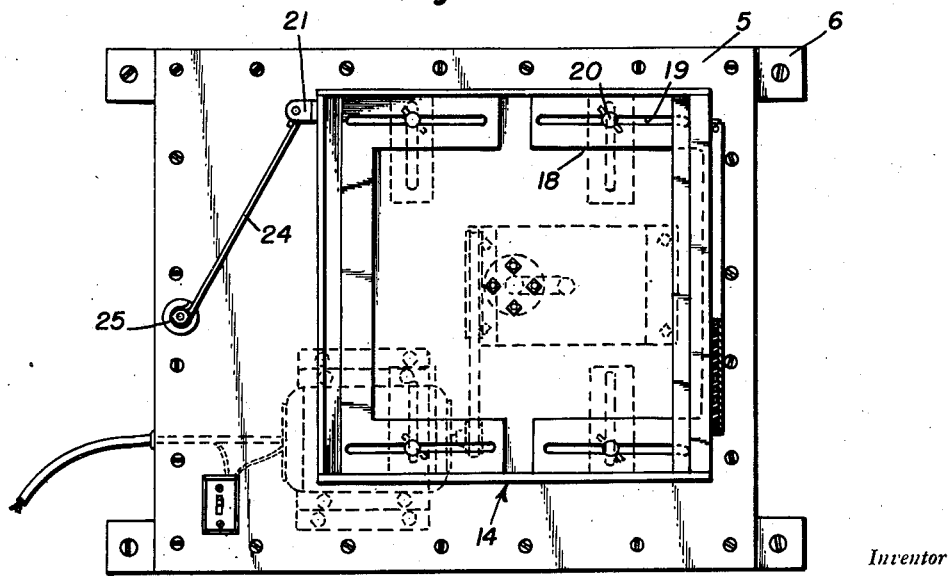
Figure 2 is a top plan view.
Figure 3:
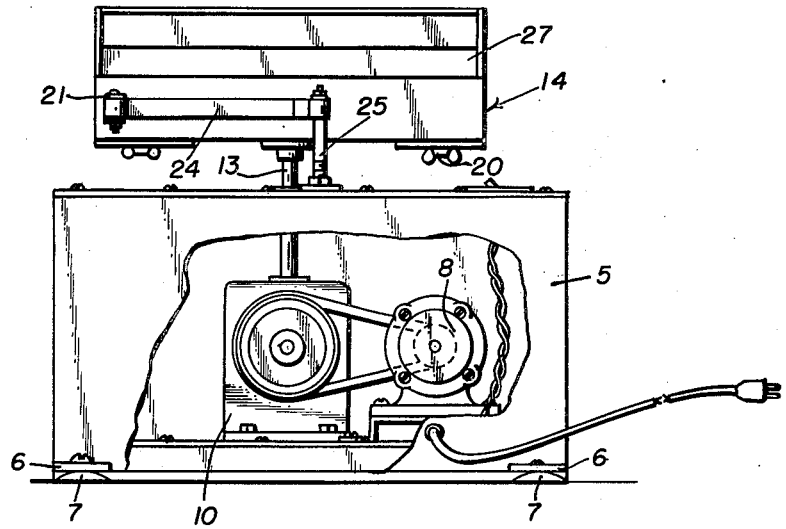
Figure 3 is a side elevational view with parts broken away and shown in section.
Figure 4:
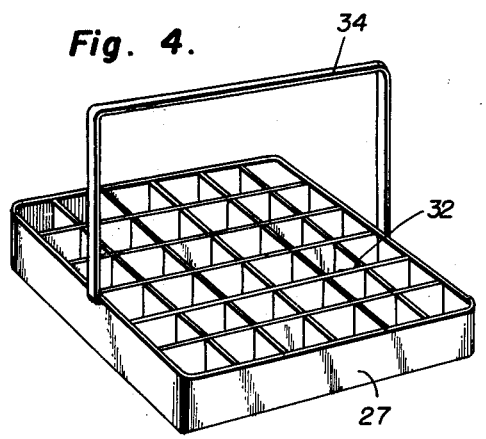
Figure 4 is a perspective view of one of the carrying trays for the test bottles.
Figure 5:
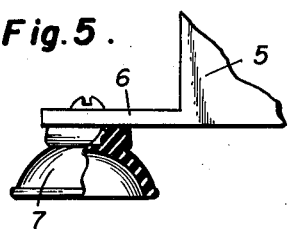
Figure 5 is a fragmentary side elevational view of the suction cup legs for supporting the cabinet.

Referring now to the drawings in detail, wherein for the purpose of illustration I have disclosed a preferred embodiment of the invention, the numeral 5 designates a cabinet of predetermined shape and size and preferably constructed of sheet metal and formed with outwardly projecting flanges or brackets 6 at its corners to the underside of which are secured suction cups 7 for supporting the cabinet on a suitable supporting surface against sliding movement.

The cabinet provides a motor housing in which an electric motor 8 is mounted for driving a vertical shaft 9 journaled in a gear housing 10 by means of a conventional reduction gearing 11.

The shaft 9 extends upwardly through the top 12 of the cabinet and is formed at its upper end with a crank 13.

A mixing tray designated generally at 14 includes a bottom 15 to the underside of which a socket 16 is secured for receiving the upper end of the crank 13 for rotation therein.

The mixing tray 14 also includes side walls 17 which are movable inwardly and outwardly at the edges of the bottom 15 by means of tongues 18 projecting inwardly at the lower edges of the side walls and formed with slots 19 in which bolts and wing nuts 20 carried by the bottom 15 are received to secure the side walls in horizontally adjusted position on the bottom 15 inwardly or outwardly with respect thereto to adjust the sides of the mixing tray.

To one of the side walls 17 are secured upper and lower angle brackets 21 and 22 for supporting a vertical pivot pin 23 and to which one end of an oscillating arm 24 is pivotally attached. The other end of the arm 24 is pivoted on an upstanding bolt 25 suitably secured to the top 12 of the cabinet adjacent one side thereof.

The side wall 17 and the side of the mixing tray 14 opposite from the arm 24 is provided on its inner side with an angle iron strip 26 forming a shelf for supporting one edge of a carrying tray 27 in an inclined position when placed in the mixing tray 14 as shown in Figure 1 of the drawings.

To the upper edge of the side wall provided with the shelf 26 is an upwardly extending wall extension 28 hingedly connected at its lower edge to the upper edge of the wall 17 by a spring hinge 29 of conventional construction and arranged to urge the extension 28 inwardly against the adjacent side of the carrying tray 27. The upper edge of the extension 28 is formed with an inwardly and downwardly extending flange 30 which is inclined corresponding to the adjacent side of the carrying tray to provide close fitting engagement therewith.

The wall of the tray opposite from the extension 28 and to which the arm 24 is attached is likewise inclined as shown at 31 to conform to the adjacent inclined side of the tray 27.

The carrying tray 27 is provided with intersecting partitions 32 forming a rack within which Babcock test bottles 33 are adapted to be placed to separate the bottles when placed in the tray.

The tray 27 is also provided with a carrying handle 34.

In the operation of the device with the test bottles 33 placed in the carrying tray 27 as shown in Figure 1 and then placed in the mixing tray 14 in an inclined position, the motor 8 upon being energized will rotate the crank 13 and by reason of the connection of the tray 14 with the arm 24 an oscillating motion of the tray will be imparted in an elliptical path to, thus thoroughly cause agitation and mixing of the contents of the bottles.

The sloping position of the bottles in the tray 27 will prevent forcing of the milk and acid in the bottles upwardly into the neck of the bottles when heat is generated by the acid as it mixes with the milk.

The bottles are held in the tray 27 in a prearranged order to prevent error in test identification and the mixing tray 14 may be adjusted to accommodate carrying trays 27 of various sizes in accordance with the number of bottles to be tested.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A mixer for test bottles of the class described and including an agitating tray having horizontally movable walls to adjust the area of the tray, a carrying tray, means carried by one of the walls for supporting the carrying tray in the agitating tray in an inclined position, a pair of the opposed walls of the agitating tray having inclined portions bearing against upper and lower end portions of the carrying tray, and power operated means connected to the agitating tray and arranged to move the latter in a horizontal path.

2. A mixer for test bottles of the class described and including an agitating tray having a floor and walls horizontally movable on the floor to adjust the area of the tray, a carrying tray, means carried by one of the walls for supporting the carrying tray in the agitating tray in an inclined position, a spring biased vertical extension on one of the walls of the agitating tray, inclined internal portions on said extension and on an opposed wall of the agitating tray flatly bearing against upper and lower end portions of the carrying tray to tightly hold the trays one within the other.

3. A mixer for test bottles of the class described and including an agitating tray having a floor and walls, a carrying tray, means carried by one of the walls for supporting the carrying tray in the agitating tray in an inclined position, a spring biased vertical extension on one of the walls of the agitating tray, inclined internal portions on said extension and on an opposed wall of the agitating tray flatly bearing against upper and lower end portions of the carrying tray to tightly hold the trays one within the other.

4. In a mixer for test bottles, a frame, an agitating tray, a vertical shaft having a crank connected to the bottom of the tray for oscillating the tray, said crank being rotatably supported in the frame, and an arm pivotally connected to and between the frame and the tray to guide the tray in an elliptical path, a bottle carrying means mounted at an angle within said agitating tray so that bottles therein are inclined to the vertical.

5. In a mixer for test bottles, a frame, an agitating tray, a vertical shaft having a crank connected to the bottom of the tray for oscillating the tray, said crank being rotatably supported in the frame, and an arm pivotally connected to and between the frame and the tray to guide the tray in an elliptical path, a bottle carrying means mounted at an angle within said agitating tray so that bottles therein are inclined to the vertical, said means comprising a carrying tray having a bottom plate and walls, said agitating tray having clamping means to engage said bottom plate and walls.

GEORGE F. MASSEY.

REFERENCES CITED

The following references are of record in the file of this patent:

UNITED STATES PATENTS

| Number | Name | Date |
|---|---|---|
| 775,059 | Wise | Nov. 15, 1904 |
| 856,619 | Camp et al. | June 11, 1907 |
| 1,085,450 | Lopez | Jan. 27, 1914 |
| 1,343,091 | Shearer | June 8, 1920 |
| 1,352,330 | Tyler | Sept. 7, 1920 |
| 2,339,092 | Meltzer | Jan. 11, 1944 |
| 2,345,130 | Latham | Mar. 28, 1944 |